United States Patent
Haramaty et al.

(10) Patent No.: US 9,973,435 B2
(45) Date of Patent: May 15, 2018

(54) LOOPBACK-FREE ADAPTIVE ROUTING

(71) Applicant: Mellanox Technologies TLV Ltd., Raanana (IL)

(72) Inventors: Zachy Haramaty, Hemed (IL); Itamar Rabenstein, Petach Tikva (IL); Amiad Marelli, Tel Aviv (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 93 days.

(21) Appl. No.: 14/970,608

(22) Filed: Dec. 16, 2015

(65) Prior Publication Data

US 2017/0180243 A1    Jun. 22, 2017

(51) Int. Cl.
*H04L 12/853* (2013.01)
*H04L 12/705* (2013.01)

(52) U.S. Cl.
CPC .......... *H04L 47/2416* (2013.01); *H04L 45/18* (2013.01)

(58) Field of Classification Search
CPC ..... H04L 45/18; H04L 47/2416; H04L 12/42; H04L 12/4645
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | LeMaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 * | 9/2003 | Wong ............ H04L 47/10 370/232 |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,831,918 B1 | 12/2004 | Kavak |
| 6,912,604 B1 | 6/2005 | Tzeng et al. |

(Continued)

FOREIGN PATENT DOCUMENTS

WO    WO 2016105446 A1 *    6/2016 ......... H04L 12/6418

OTHER PUBLICATIONS

Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.

(Continued)

*Primary Examiner* — Redentor Pasia
(74) *Attorney, Agent, or Firm* — D. Kligler IP Services Ltd.

(57) ABSTRACT

A method for communication includes, in a network node that includes a plurality of ports, specifying for a given destination address at least one Adaptive Routing (AR) group. The at least one AR group includes two or more ports over which packets destined to the given destination address are to be adaptively routed. A packet destined to the given destination address is received at the network node, via one of the ports serving as an ingress port. An egress port is adaptively selected for the packet, from the ports in the at least one AR group but excluding the ingress port over which the packet was received. The packet is routed to the selected egress port.

8 Claims, 4 Drawing Sheets

```
┌─────────────────────────────────────────────────────────────┐
│ PER DLID, SPECIFY MULTIPLE AR GROUPS, EACH AR GROUP SPECIFIED│
│ FOR ROUTING PACKETS ARRIVING VIA A SUBSET OF THE INGRESS    │──60
│ PORTS, AND EXCLUDES THESE PORTS AS POSSIBLE EGRESS PORTS    │
└─────────────────────────────────────────────────────────────┘
                            │
                            ▼
      ┌──────────────────────────────────────────────────┐
      │ RECEIVE PACKET ADDRESSED TO DLID, VIA INGRESS PORT│──64
      └──────────────────────────────────────────────────┘
                            │
                            ▼
      ┌──────────────────────────────────────────┐
      │ ROUTE PACKET USING AR GROUP DEFINED      │
      │ FOR THE DLID AND FOR INGRESS PORT OF     │──68
      │ PACKET                                    │
      └──────────────────────────────────────────┘
```

(56) References Cited

U.S. PATENT DOCUMENTS

| | | |
|---|---|---|
| 6,950,428 B1 | 9/2005 | Horst et al. |
| 7,010,607 B1 | 3/2006 | Bunton |
| 7,076,569 B1 | 7/2006 | Bailey et al. |
| 7,234,001 B2 | 6/2007 | Simpson et al. |
| 7,286,535 B2 | 10/2007 | Ishikawa et al. |
| 7,676,597 B2 | 3/2010 | Kagan et al. |
| 7,746,854 B2 | 6/2010 | Ambe et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,755,389 B1 | 6/2014 | Poutievski et al. |
| 8,774,063 B2 | 7/2014 | Beecroft |
| 8,873,567 B1* | 10/2014 | Mandal .................. H04L 12/26 370/400 |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,571,400 B1* | 2/2017 | Mandal .................. H04L 47/125 |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1* | 6/2002 | Reeves ............... H04L 12/5601 370/400 |
| 2002/0136163 A1 | 9/2002 | Kawakami et al. |
| 2002/0138645 A1 | 9/2002 | Shinomiya et al. |
| 2002/0141412 A1* | 10/2002 | Wong .................. H04L 47/10 370/392 |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0223453 A1 | 12/2003 | Stoler et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1* | 6/2006 | See ..................... H04L 43/026 709/227 |
| 2006/0182034 A1 | 8/2006 | Klinker et al. |
| 2006/0291480 A1 | 12/2006 | Cho et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0112413 A1 | 5/2008 | Pong |
| 2008/0165797 A1 | 7/2008 | Aceves |
| 2008/0186981 A1* | 8/2008 | Seto .................. H04L 12/4641 370/395.53 |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0103534 A1 | 4/2009 | Malledant et al. |
| 2009/0119565 A1 | 5/2009 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1* | 11/2010 | Ankaiah ............. H04L 12/4641 370/315 |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1* | 7/2012 | Abts ..................... H04L 45/06 370/392 |
| 2012/0207175 A1* | 8/2012 | Raman .................. H04L 47/125 370/412 |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1* | 5/2013 | Wakumoto .......... H04L 12/4641 370/406 |
| 2013/0170451 A1 | 7/2013 | Krause et al. |
| 2013/0208720 A1* | 8/2013 | Ellis ..................... H04L 12/18 370/390 |
| 2013/0242745 A1 | 9/2013 | Umezuki |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0336116 A1 | 12/2013 | Vasseur et al. |
| 2014/0043959 A1 | 2/2014 | Owens et al. |
| 2014/0140341 A1 | 5/2014 | Bataineh et al. |
| 2014/0192646 A1 | 7/2014 | Mir et al. |
| 2014/0198636 A1* | 7/2014 | Thayalan ................ H04L 47/41 370/228 |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1* | 4/2015 | Sivabalan ............... H04L 45/28 370/225 |
| 2015/0098466 A1 | 4/2015 | Haramaty et al. |
| 2015/0124815 A1 | 5/2015 | Beliveau et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0372898 A1 | 12/2015 | Haramaty et al. |
| 2015/0372916 A1 | 12/2015 | Haramaty et al. |
| 2016/0014636 A1 | 1/2016 | Bahr et al. |
| 2016/0080120 A1* | 3/2016 | Unger ................... H04L 12/462 370/249 |
| 2016/0080321 A1* | 3/2016 | Pan ..................... H04L 63/0263 726/11 |
| 2016/0182378 A1 | 6/2016 | Basavaraja et al. |
| 2017/0054591 A1 | 2/2017 | Hyoudou et al. |

OTHER PUBLICATIONS

U.S. Appl. No. 14/732,853 Office Action dated Jan. 26, 2017.

U.S. Appl. No. 14/662,259 Office Action dated Sep. 22, 2016.

(56) References Cited

OTHER PUBLICATIONS

Afek et al., "Sampling and Large Flow Detection in SDN", SIGCOMM '15, pp. 345-346, Aug. 17-21, 2015, London, UK.
U.S. Appl. No. 14/745,488 Office Action dated Dec. 6, 2016.
U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
InfiniBand Trade Association, "InfiniBandTM Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03),Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International Conference on Wireless, Mobile and Multimedia Networks, , pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
U.S. Appl. No. 14/046,976 Office Action dated Jan. 14, 2016.
Raindel et al., U.S. Appl. No. 14/673,892, filed Mar. 31, 2015.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Nkposong et al., "Experiences with BGP in Large Scale Data Centers:Teaching an old protocol new tricks", 44 pages, Jan. 31, 3014.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Glass et al., "The turn model for adaptive routing", Journal of the ACM, vol. 41, No. 5, pp. 874-903, Sep. 1994.
U.S. Appl. No. 14/673,892 Office Action dated Jun. 1, 2017.
U.S. Appl. No. 15/152,077 office action dated Dec. 1, 2017.
U.S. Appl. No. 15/050,480 office action dated Jan. 22, 2018.
U.S. Appl. No. 15/387,718 office action dated Mar. 9, 2018.

* cited by examiner

| INGRESS PORT | AR GROUP = f(INGRESS PORT) |
|---|---|
| 54A | 54B or 54C or 54D |
| 54B | 54A or 54C or 54D |
| 54C | 54A or 54B or 54D |
| 54D | 54A or 54B or 54C |

| INGRESS PORT | AR GROUP = f(INGRESS PORT) |
|---|---|
| 54A or 54C | 54B or 54D |
| 54B or 54D | 54A or 54C |

LOOPBACK-FREE ADAPTIVE ROUTING

FIELD OF THE INVENTION

The present invention relates generally to communication networks, and particularly to methods and systems for adaptive routing of packets.

BACKGROUND OF THE INVENTION

Various techniques for adaptive routing of packets in communication networks are known in the art. Some adaptive routing techniques are used in Dragonfly-topology networks. The Dragonfly topology is described, for example, by Kim et al., in "Technology-Driven, Highly-Scalable Dragonfly Topology," Proceedings of the 2008 International Symposium on Computer Architecture, Jun. 21-25, 2008, pages 77-88, which is incorporated herein by reference. U.S. Patent Application Publication 2010/0049942 to Kim et al., whose disclosure is incorporated herein by reference, describes a Dragonfly processor interconnect network that comprises a plurality of processor nodes, a plurality of routers, each router directly coupled to a plurality of terminal nodes, the routers coupled to one another and arranged into a group, and a plurality of groups of routers, such that each group is connected to each other group via at least one direct connection.

Jiang et al. describe indirect global adaptive routing (IAR) schemes in Dragonfly networks, in which the adaptive routing decision uses information that is not directly available at the source router, in "Indirect Adaptive Routing on Large Scale Interconnection Networks," Proceedings of the 2009 International Symposium on Computer Architecture, Jun. 20-24, 2009, pages 220-231, which is incorporated herein by reference.

Garcia et al. describe a routing/flow-control scheme for Dragonfly networks, which decouples the routing and the deadlock avoidance mechanisms, in "On-the-Fly Adaptive Routing in High-Radix Hierarchical Networks," Proceedings of the 2012 International Conference on Parallel Processing (ICPP), Sep. 10-13, 2012, which is incorporated herein by reference.

Prisacari et al. investigate indirect routing over Dragonfly networks, in in "Performance implications of remote-only load balancing under adversarial traffic in Dragonflies," Proceedings of the 8th International Workshop on Interconnection Network Architecture: On-Chip, Multi-Chip, Jan. 22, 2014, which is incorporated herein by reference.

U.S. Patent Application Publication 2012/0144064, whose disclosure is incorporated herein by reference, describes a dragonfly processor interconnect network that comprises a plurality of processor nodes and a plurality of routers. The routers are operable to adaptively route data by selecting from among a plurality of network paths from a target node to a destination node in the dragonfly network, based on network congestion information from neighboring routers and failed network link information from neighboring routers.

As another example, U.S. Patent Application Publication 2012/0144065, whose disclosure is incorporated herein by reference describes a dragonfly processor interconnect network that comprises a plurality of processor nodes and a plurality of routers. The routers are operable to route data by selecting from among a plurality of network paths from a target node to a destination node in the dragonfly network based on one or more routing tables.

SUMMARY OF THE INVENTION

An embodiment that is described herein provides a method for communication including, in a network node that includes a plurality of ports, specifying for a given destination address at least one Adaptive Routing (AR) group. The at least one AR group includes two or more ports over which packets destined to the given destination address are to be adaptively routed. A packet destined to the given destination address is received at the network node, via one of the ports serving as an ingress port. An egress port is adaptively selected for the packet, from the ports in the at least one AR group but excluding the ingress port over which the packet was received. The packet is routed to the selected egress port.

In some embodiments, specifying the at least one AR group includes specifying for the given destination address multiple AR groups, such that (i) each AR group is specified for routing the packets arriving via one or more specified ingress ports and (ii) each AR group includes only egress ports that are different from the ingress ports for which that AR group is specified. In an embodiment, a given egress port is common to two or more of the AR groups.

In another embodiment, adaptively selecting the egress port includes identifying, from among the multiple AR groups, an AR group specified for the ingress port via which the packet was received, and adaptively selecting the egress port from the identified AR group. In yet another embodiment, adaptively selecting the egress port includes identifying, from among the multiple AR groups, an AR group specified for (i) the ingress port via which the packet was received and (ii) a Virtual Lane (VL) of the packet, and adaptively selecting the egress port from the identified AR group.

In alternative embodiments, specifying the at least one AR group includes adaptively specifying within an AR group a primary egress port and a secondary egress port, and adaptively selecting the egress port includes: selecting the primary egress port if the ingress port is different from the primary egress port; and selecting the secondary egress port if the ingress port is equal to the primary egress port.

In an example embodiment, selecting the secondary egress port includes retrieving an identity of the secondary egress port from a memory of the network node. In another embodiment, selecting the secondary egress port includes applying a hash function that selects the secondary egress port from among the ports in the AR group other than the primary egress port. In yet another embodiment, selecting the secondary egress port includes selecting a port specified for static routing.

There is additionally provided, in accordance with an embodiment of the present invention, a network node including a plurality of ports and circuitry. The circuitry, is configured to specify for a given destination address at least one Adaptive Routing (AR) group, which includes two or more ports over which packets destined to the given destination address are to be adaptively routed, to receive, via one of the ports serving as an ingress port, a packet destined to the given destination address, to adaptively select an egress port for the packet, from the ports in the at least one AR group but excluding the ingress port over which the packet was received, and to route the packet to the selected egress port.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
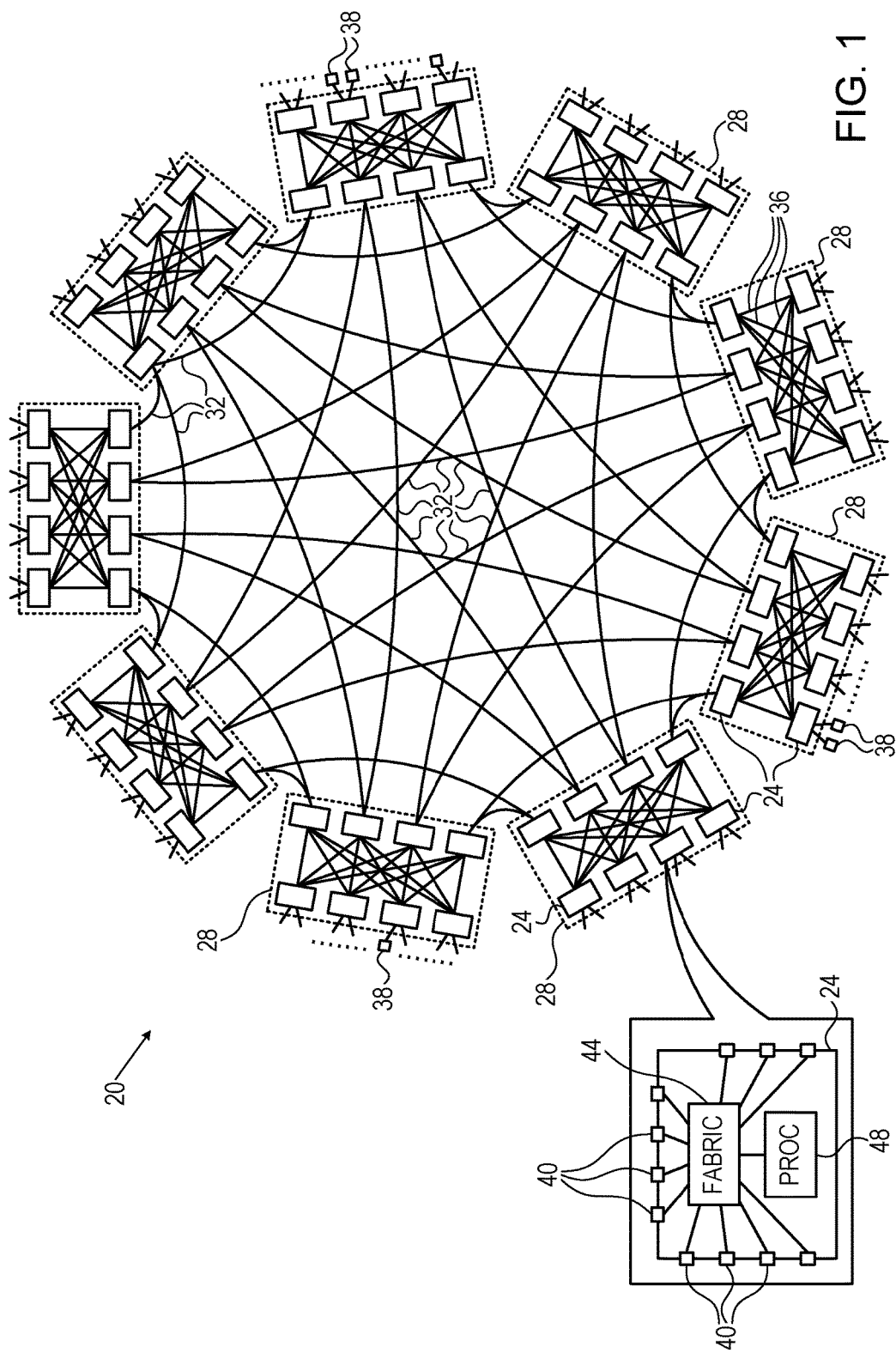
FIG. 1 is a block diagram that schematically illustrates a high-performance computer network, in accordance with an embodiment of the present invention.

In some network configurations it is important to prevent loopback paths. In a network switch or other network node, for example, preventing loopback means that a packet should not be forwarded over the same port via which it was received. When the network node uses Adaptive Routing (AR), however, loopback prevention may conflict with AR operation and cause performance degradation. Embodiments of the present invention that are described herein provide improved methods and systems for Adaptive Routing (AR). The disclosed techniques are loopback free, and at the same time cause minimal degradation in AR performance.

In some embodiments, a network node comprises multiple ports, which can serve as ingress ports for receiving packets and/or as egress ports for sending packets. In some embodiments, the node applies adaptive routing per destination address. The node specifies, per destination address, a group of ports from which to adaptively select an egress port for packets destined to that destination address. This group of ports is referred to herein as an AR group.

Typically, the node aims to re-select the egress port as rarely as possible, e.g., in order to reduce the likelihood that packets will reach the destination out-of-order. The node will typically retain the same egress port selection for a given destination address, unless performance over this port becomes unacceptable.

From time to time, however, packets destined to the given destination address may arrive over the same port that currently serves as the selected egress port. Forwarding such a packet over the currently-selected egress port (thereby preventing packet re-ordering) may create loopback. Forwarding such a packet over a different egress port (thereby preventing loopback) may create packet re-ordering. In some embodiments that are described herein, the node uses improved AR schemes that avoid the above-described dilemma.

In one embodiment, the node specifies multiple AR groups for a given destination address. Each AR group is specified for routing the packets arriving via one or more specified ingress ports. In addition, each AR group comprises only egress ports that are different from the ingress ports for which that AR group is specified. For example, for the case of four ports denoted A, B, C and D, the node may specify the AR group {B,C,D} for packets arriving over port A, the AR group {A,C,D} for packets arriving over port B, the AR group {A,B,D} for packets arriving over port C, and the AR group {A,B,C} for packets arriving over port D.

When a packet destined to the given destination address arrives over a certain ingress port, the node identifies the AR group that is specified for that ingress port, and routes the packet to one of the egress ports in this AR group. Within each AR group, the node can retain the egress-port selection for long periods of time. At the same time, because of the way the AR groups are specified, the selected egress port is guaranteed to be different from the ingress port.

In another embodiment, the node specifies a single AR group per destination address. Within the AR group, in addition to the currently-selected egress port (which is referred to in this embodiment as a primary egress port), the node also specifies a secondary egress port. When a packet destined to the given destination address arrives over a certain ingress port, the node checks whether the ingress port is different from the currently-selected egress port (the primary egress port). If so, the node forwards the packet over the primary egress port. Otherwise, the node forwards the packet over the secondary egress port. The latter technique has a slightly higher likelihood of packet re-ordering relative to the former technique. On the other hand, the latter technique requires considerably less memory space for storing the AR groups.

Several example implementations of the disclosed techniques are described in detail below. The disclosed AR schemes are demonstrated below in a network topology referred to as "Dragonfly plus," but they are applicable in various other network topologies.

System Description

FIG. 1 is a block diagram that schematically illustrates a high-performance computer network 20, in accordance with an embodiment of the present invention. Network 20 may comprise, for example, a data center, a High-Performance Computing (HPC) system or any other suitable type of network.

Network 20 comprises multiple network nodes 24, also referred to herein simply as nodes for brevity. Nodes 24 typically comprise packet switches or routers. Nodes 24 are arranged in multiple groups 28. Groups 28 are connected to one another using network links 32, e.g., optical fibers, each connected between a port of a node in one group and a port in a node of another group. Links 32 are referred to herein as inter-group links or global links.

The set of links 32 is referred to herein collectively as an inter-group network or global network. In the disclosed embodiments, the inter-group network has a mesh topology, i.e., every group 28 is connected to every other group 28 using at least one direct inter-group link 32. Put in another way, any pair of groups 28 comprise at least one respective pair of nodes 24 (one node in each group) that are connected to one another using a direct inter-group link 32.

The nodes within each group 28 are interconnected by network links 36, e.g., optical fibers. Each link 36 is connected between respective ports of two nodes within a given group 28. Links 36 are referred to herein as intra-group links or local links, and the set of links 36 in a given group 28 is referred to herein collectively as an intra-group network or local network. Within each group 28, nodes 24 are connected in a bipartite graph topology. In such a topology, the nodes are divided into two subsets, such that all links 36 connect a node of one subset and a node of the other subset. In other words, no direct links connect between nodes of the same subset.

In an example embodiment, the nodes in each group are connected in a Fat Tree (FT) topology. Alternatively, however, the intra-group network may be implemented using any other suitable bipartite topology. The bipartite topology may be full (i.e., every node in one subset is directly connected to every node in the other subset) or partial. The two subsets may be of the same size or of different sizes. In a partial bipartite topology, not every node of one subset is connected to every node of the other subset. A bipartite topology may be partial by design, e.g., in order to save cost, or as a result of link failure. In some bipartite topologies, a certain pair of nodes may be connected by two or more local links 36 in parallel. In the context of the present patent application and in the claims, all such variations are regarded as bipartite topologies.

Within a given group 28, one subset of nodes 24 (referred to as spine nodes) connect the group to the mesh network using links 32. The other subset of nodes 24 (referred to as leaf nodes) are connected to hosts 38, also referred to as endpoints or clients. Hosts 38 may comprise any suitable type of computing devices, such as servers. In the example of FIG. 1, each group 28 comprises four spine nodes and four leaf nodes.

Additional aspects of routing packets over network topologies such as the topology of network 20 are addressed in U.S. patent application Ser. No. 14/337,334, entitled "Dragonfly Plus: Communication over Bipartite Node Groups Connected by a Mesh Network," filed Jul. 22, 2014, which is assigned to the assignee of the present patent application and whose disclosure is incorporated herein by reference.

An inset at the bottom-left of the figure shows a simplified view of the internal configuration of node 24, in an example embodiment. The other nodes typically have a similar structure. In this example, node 24 comprises multiple ports 40 for connecting to links 32 and/or 36 and/or endpoints 38, a switch fabric 44 that is configured to forward packets between ports 40, and a processor 48 that carries out the methods described herein. In the context of the present patent application and in the claims, fabric 44 and processor 48 are referred to collectively as circuitry that carries out the disclosed techniques.

In the embodiments described herein, network 20 operates in accordance with the InfiniBand™ standard. Infiniband communication is specified, for example, in "Infiniband™ Architecture Specification," Volume 1, Release 1.2.1, November, 2007, which is incorporated herein by reference. In particular, section 7.6 of this specification addresses Virtual Lanes (VL) mechanisms, section 7.9 addresses flow control, and chapter 14 addresses subnet management (SM) issues. In alternative embodiments, however, network 20 may operate in accordance with any other suitable communication protocol or standard, such as IPv4, IPv6 (which both support ECMP) and "controlled Ethernet."

In some embodiments, network 20 is associated with a certain Infiniband subnet, and is managed by a processor referred to as a subnet manager (SM). The SM tasks may be carried out, for example, by software running on one or more of processors 48 of nodes 24, and/or on a separate processor. Typically, the SM configures switch fabrics 44 and/or processors 48 in the various nodes 24 to carry out the methods described herein.

The configurations of network 20 and node 24 shown in FIG. 1 are example configurations that are depicted purely for the sake of conceptual clarity. In alternative embodiments, any other suitable network and/or node configuration can be used. For example, groups 28 need not necessarily comprise the same number of nodes, and each group 28 may comprise any suitable number of nodes. The nodes in a given group 28 may be arranged in any suitable bipartite graph topology, whether full or partial.

The different elements of nodes 24 may be implemented using any suitable hardware, such as in an Application-Specific Integrated Circuit (ASIC) or Field-Programmable Gate Array (FPGA). In some embodiments, some elements of nodes 24 can be implemented using software, or using a combination of hardware and software elements. In some embodiments, processors 48 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

As can be seen in FIG. 1, traffic between a pair of endpoints 38 can be routed over various paths in network 20, i.e., various combinations of local links 36 and global links 32. The topology of network 20 thus provides a high degree of fault tolerance, and enables effective load balancing.

Figure 2:
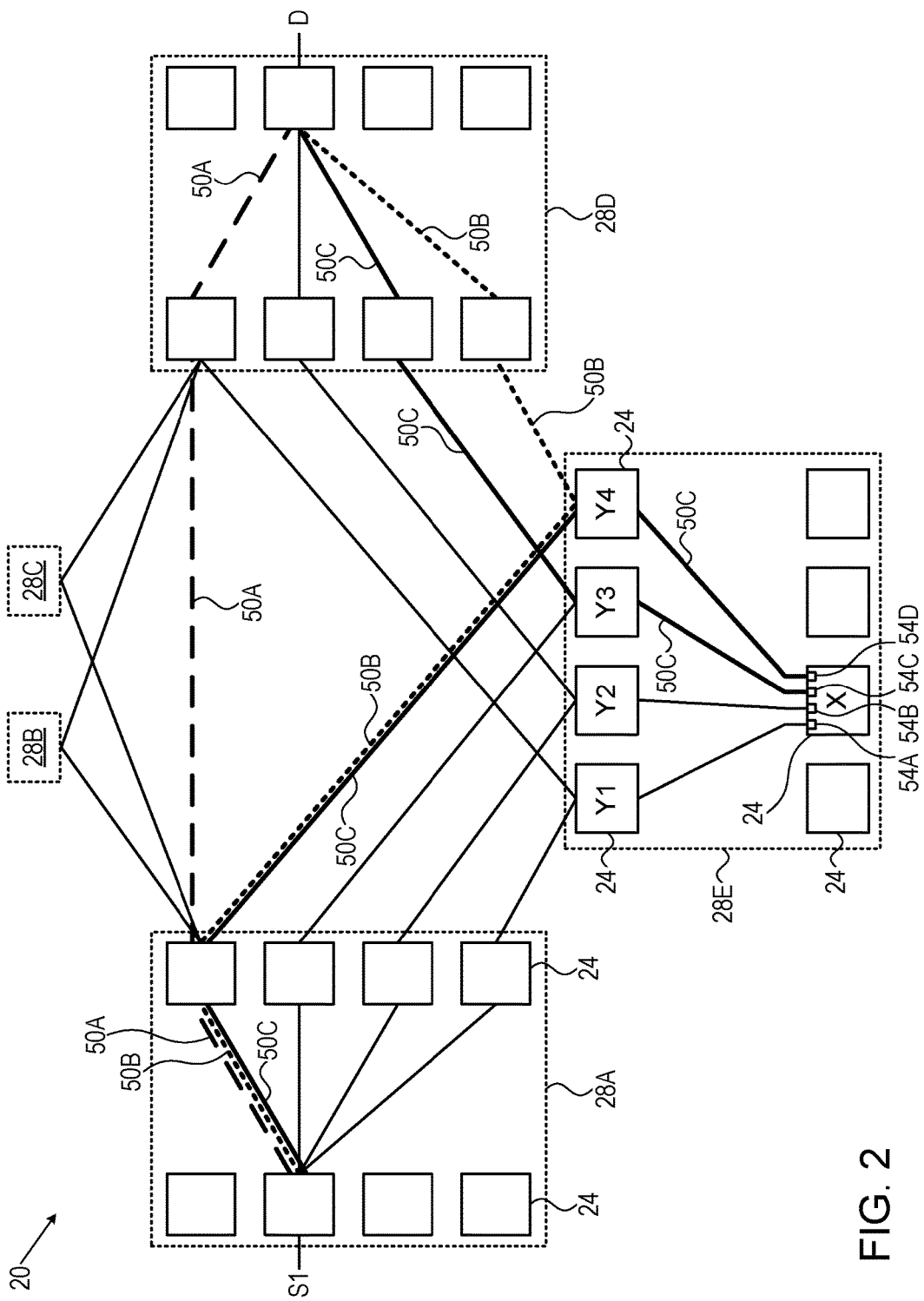
FIG. 2 is a diagram showing alternative routing paths in the network of FIG. 1, in accordance with an embodiment of the present invention.

FIG. 2 is a diagram that schematically illustrates example routing paths in network 20, in accordance with an embodiment of the present invention. Only five node groups 28A . . . 28E, and only a subset of the nodes and local and global links are shown, for the sake of clarity. The present example shows three possible routing paths 50A . . . 50C, which connect a source endpoint S1 in group 28A to a destination endpoint D in group 28D. Paths 50A . . . 50C are chosen by way of example—Many other paths exist between endpoints S1 and D.

Path 50A is the shortest path, traversing a local link, then a global link, and finally another local link. Such a path is most likely to have the smallest latency, especially since it the traffic is routed directly from group 28A to group 28D without traversing any intermediate group. Path 50B traverses a local link, then two global links (via group 28E— serving in this case as an intermediate group), and finally another local link. In this path, in intermediate group 28E the traffic traverses only one of the spine nodes without reaching the leaf nodes. Path 50C traverses a local link, then a global link to intermediate group 28E, then two local links inside group 28E, and finally another local link. In this path, in intermediate group 28E the traffic traverses two spine nodes and one leaf node.

Loopback-Free Adaptive Routing

In some embodiments, one or more network nodes 24 in network 20 route packets using routing schemes that implement Adaptive Routing (AR), and at the same time do not cause loopback paths. The description that follows focuses on a specific leaf node marked X, having four ports 54A . . . 54D, shown at the bottom of FIG. 2. The disclosed techniques, however, can be used in other types of network nodes and in other network topologies.

In the present example, node X is connected to four spine nodes Y1, Y2, Y3 and Y4, via ports 54A, 54B, 54C and 54D, respectively. Consider, for example, packets that originate in source endpoint S1 in group 28A and are destined to destination endpoint D in group 28D. As explained above, such packets may traverse various possible paths in network 20. In particular, packets whose destination address is endpoint D may arrive at node X via any of nodes Y1 . . . Y4, i.e., via any of ports 54A . . . 54D.

In some embodiments, node X routes these packets using AR methods that are guaranteed not to create loopback, i.e., not to forward a packet over the same port via which the packet was received. The description that follows refers to an Infiniband-based implementation in which destination addresses are referred to as Destination Local Identifier (DLID). Generally, however, the disclosed techniques can be implemented in other suitable network types and with other suitable types of destination addresses.

Figures 3, 4A, 4B:
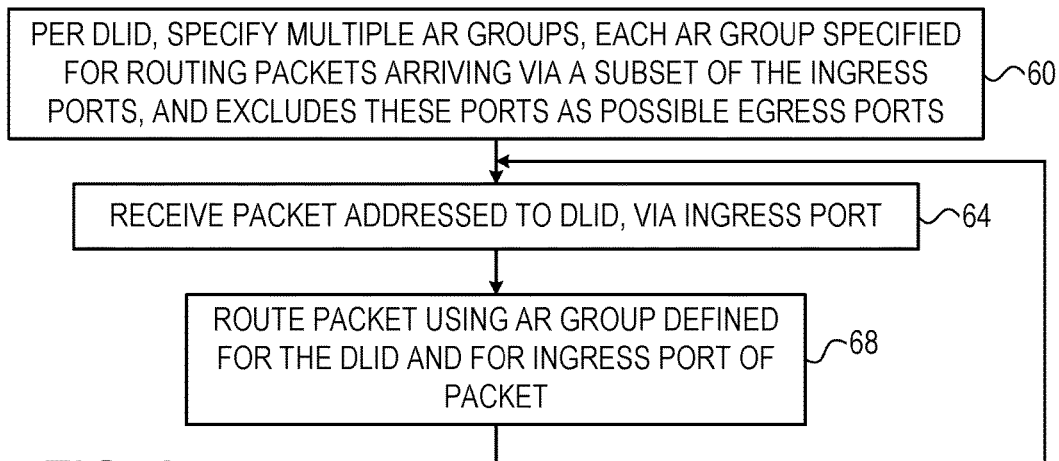
FIG. 3 is a flow chart that schematically illustrates a method for loopback-free Adaptive Routing (AR), in accordance with an embodiment of the present invention.
FIGS. 4A and 4B are diagrams showing AR groups used for loopback-free adaptive routing, in accordance with embodiments of the present invention.

FIG. 3 is a flow chart that schematically illustrates a method for loopback-free Adaptive Routing (AR), in accordance with an embodiment of the present invention. The method begins with the circuitry (typically processor 48) of node X specifying multiple AR groups per DLID, at a groups specification step 60.

For a given DLID, each AR group is specified for routing the packets arriving via one or more specified ingress ports. In addition, each AR group comprises only egress ports that are different from the ingress ports for which that AR group is specified. Two non-limiting examples of such AR groups are depicted in FIGS. 4A and 4B below.

At a packet reception step 64, the circuitry of node X receives a packet destined to the DLID of endpoint D. The packet is received via one of ports 54A . . . 54D that, for that packet, serves as ingress port. At a routing step 68, the circuitry of node X identifies the AR group that is specified for the ingress port via which the packet arrived, and then routes the packet to one of the egress ports in this AR group. The method then loops back to step 64 above for processing the next packet.

FIG. 4A is a diagram showing AR groups that may be used in the loopback-free AR scheme of FIG. 3, in accordance with an embodiment of the present invention. In the present example, node X uses four AR groups: For packets whose ingress port is port 54A, the node uses the AR group {54B,54C,54D}. For packets whose ingress port is port 54B, the node uses the AR group {54A,54C,54D}. For packets whose ingress port is port 54C, the node uses the AR group {54A,54B,54D}. For packets whose ingress port is port 54D, the node uses the AR group {54A,54B,54C}.

As can be seen in FIG. 4A, the use of these AR groups ensures that a packet cannot enter and exit node X on the same port. Therefore, AR is carried out without causing loopback. This example also demonstrates that an overlap may exist between the AR groups, i.e., a certain port may appear in two or more different AR groups.

FIG. 4B is a diagram showing AR groups that may be used in the loopback-free AR scheme of FIG. 3, in accordance with an alternative embodiment of the present invention. In this example, node X uses two AR groups: For packets whose ingress port is port 54A or port 54C, the node uses the AR group {54B,54D}. For packets whose ingress port is port 54B or port 54D, the node uses the AR group {54A,54C}. In this scheme, too, a packet cannot enter and exit node X on the same port.

The AR groups of FIGS. 4A and 4B are depicted purely by way of example. In alternative embodiments, the method of FIG. 3 can be carried out using any other suitable set of AR groups. For example, in alternative embodiments, the circuitry of node X may select the AR group based on (i) the ingress port of the packet and (ii) the Virtual Lane (VL) to which the packet belongs. Thus, a packet arriving via a certain ingress port may be routed using a certain AR group if the packet belongs to one VL, and using a different AR group if the packet belongs to a different VL.

Figure 5:
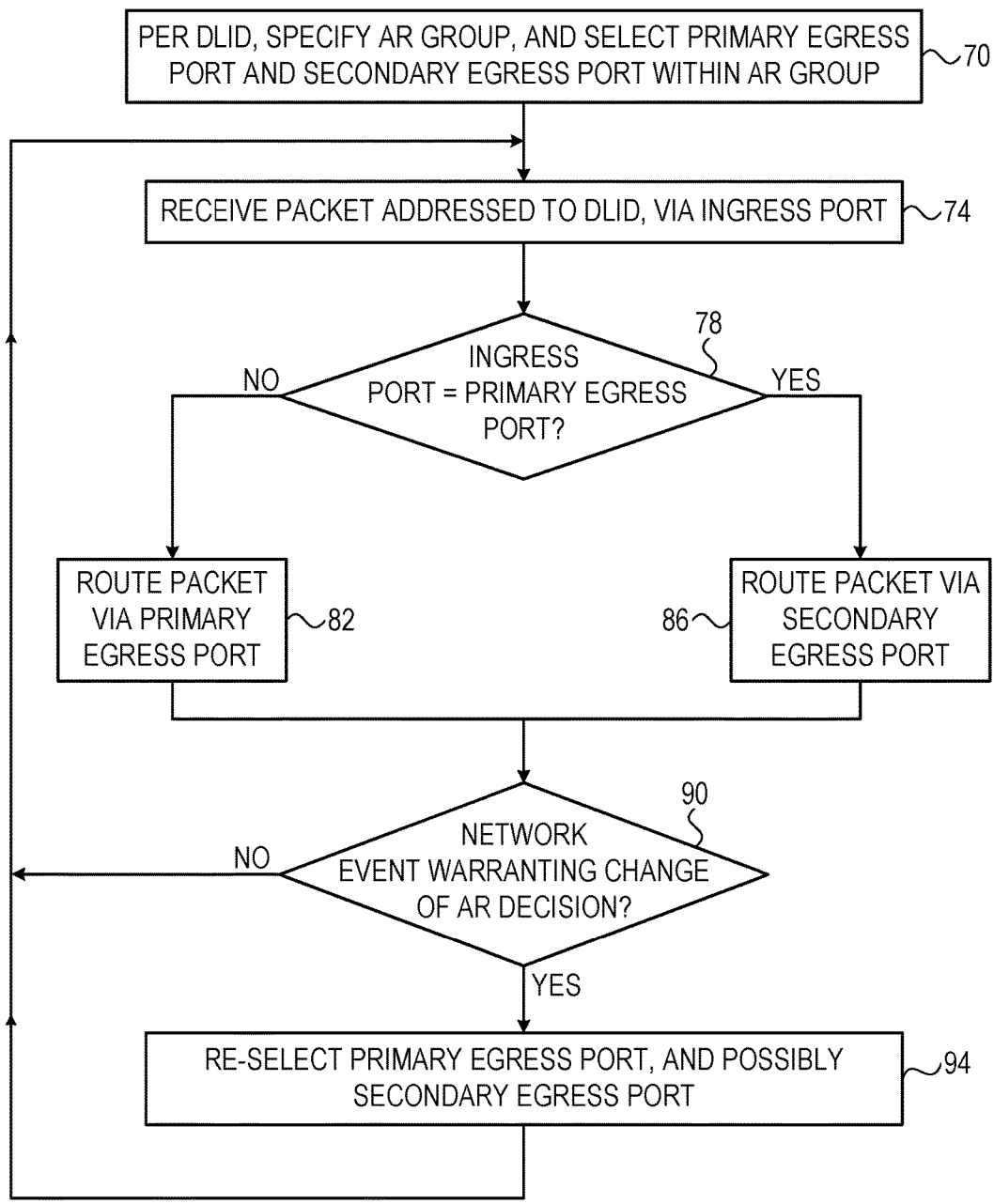
FIG. 5 is a flow chart that schematically illustrates a method for loopback-free AR, in accordance with an alternative embodiment of the present invention.

FIG. 5 is a flow chart that schematically illustrates a method for loopback-free AR, in accordance with an alternative embodiment of the present invention. In this embodiment, the circuitry of node X specifies a single AR group, at a group specification step 70. In the present example, this AR group may be {54A,54B,54C,54D}.

Within the AR group, the circuitry specifies a primary egress port and a secondary egress port for AR, for the DLID of endpoint D. The primary egress port is the port that was most recently chosen by AR for routing packets to destination endpoint D. The secondary egress port is reverted to when necessary to avoid loopback, i.e., for routing a packet that arrived via the primary egress port.

At a packet reception step 74, the circuitry of node X receives a packet destined to the DLID of endpoint D. The packet is received via one of ports 54A . . . 54D that, for that packet, serves as ingress port. At a checking step 78, the circuitry checks whether the ingress port is equal to the primary egress port. If not, the circuitry forwards the packet over the primary egress port, at a primary routing step 82. If the ingress port is equal to the primary egress port, the circuitry forwards the packet over the secondary egress port to avoid loopback, at a secondary routing step 86.

At a change checking step 90, the circuitry checks whether it is necessary to change the current AR decision, i.e., to re-specify the primary egress port. Such a change may be triggered, for example, by congestion on the primary egress port, by a failure of the primary egress port, or by some congestion or failure along the path from the primary egress port to the destination endpoint.

If no change is needed, the method loops back to step 74 above for processing the next packet. Otherwise, the circuitry re-selects the primary egress port, and possibly also the secondary egress port, at a AR decision change step 94. The method then loops back to step 74 above. In some embodiments, both the primary egress port and the secondary egress port are selected using AR. the tendency is typically to change the assignment of a primary or secondary egress port only when absolutely necessary, e.g., when the congestion on the currently-assigned egress port is unacceptable.

When implementing the method of FIG. 5, the circuitry of node X may select and store the selection of the secondary egress port in various ways. In one embodiment, the circuitry stores the identities of the primary and secondary egress ports in memory. Whenever necessary, the circuitry reads the appropriate port identity from memory. This sort of implementation, however, may be costly in terms of memory resources, especially when node X handles a large number of DLIDs.

In an alternative embodiment, the circuitry holds in memory only the identity of the primary egress port, and not of the secondary egress port. When routing reverts to the secondary egress port, the circuitry calculates the identity of the secondary egress port by applying a hash function that maps some packet attributes (e.g., the DLID) to one of the egress ports in the AR group other than the primary egress port.

In yet another embodiment, the circuitry may already hold a definition of a port that is to be used for static routing, e.g., for packets that are not permitted to undergo AR. In an embodiment, the circuitry defines this static port as the secondary egress port. This implementation, too, is efficient in terms of memory space. Further alternatively, the circuitry may select the secondary egress port, and/or store the selection of the secondary egress port, in any other way.

The loopback-free AR schemes of FIGS. 3, 4A, 4B and 5 are example schemes that are chosen purely for the sake of conceptual clarity. In alternative embodiments, any other suitable AR scheme, which guarantees that a packet cannot be sent over the same port over which it was received, can be used.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
in a network node that comprises a plurality of ports, specifying for a given destination address an Adaptive Routing (AR) group, which comprises two or more ports over which packets destined to the given destination address are to be adaptively routed, and adaptively specifying within the AR group a primary egress port and a secondary egress port;
receiving at the network node, via one of the ports that (i) serves as an ingress port and (ii) belongs to the AR group specified for the given destination address, a packet destined to the given destination address;
based on an identity of the ingress port, adaptively selecting an egress port for the packet, from among a partial subset of the AR group that excludes the ingress port over which the packet was received, by:
selecting the primary egress port if the ingress port is different from the primary egress port; and
selecting the secondary egress port if the ingress port is equal to the primary egress port; and
routing the packet to the selected egress port.

2. The method according to claim 1, wherein selecting the secondary egress port comprises retrieving an identity of the secondary egress port from a memory of the network node.

3. The method according to claim 1, wherein selecting the secondary egress port comprises applying a hash function that selects the secondary egress port from among the ports in the AR group other than the primary egress port.

4. The method according to claim 1, wherein selecting the secondary egress port comprises selecting a port specified for static routing.

5. A network node, comprising:
a plurality of ports; and
circuitry, which is configured to:
specify for a given destination address an Adaptive Routing (AR) group, which comprises two or more ports over which packets destined to the given destination address are to be adaptively routed, and adaptively specify within the AR group a primary egress port and a secondary egress port;
receive, via one of the ports that (i) serves as an ingress port and (ii) belongs to the AR group specified for the given destination address, a packet destined to the given destination address;
adaptively select, based on the identity of the ingress port, an egress port for the packet, from among a partial subset of the AR group that excludes the ingress port over which the packet was received, by:
selecting the primary egress port if the ingress port is different from the primary egress port; and
selecting the secondary egress port if the ingress port is equal to the primary egress port; and
route the packet to the selected egress port.

6. The network node according to claim 5, wherein the circuitry is configured to select the secondary egress port by retrieving an identity of the secondary egress port from a memory of the network node.

7. The network node according to claim 5, wherein the circuitry is configured to select the secondary egress port by applying a hash function that selects the secondary egress port from among the ports in the AR group other than the primary egress port.

8. The network node according to claim 5, wherein the circuitry is configured to select the secondary egress port by selecting a port specified for static routing.

* * * * *